Sept. 24, 1968   V. L. FRANTZ   3,402,529
AIR FILTER ASSEMBLY
Filed Oct. 6, 1965   2 Sheets-Sheet 2

Inventor:
Virgil L. Frantz
By Wilmer Mechlin
his Attorney

United States Patent Office 3,402,529
Patented Sept. 24, 1968

3,402,529
AIR FILTER ASSEMBLY
Virgil L. Frantz, Salem, Va., assignor to Graham-White Sales Corporation, Salem, Va., a corporation of Virginia
Filed Oct. 6, 1965, Ser. No. 493,376
8 Claims. (Cl. 55—267)

This invention relates to air filters and has for its primary object the provision of an improved air filter assembly which is adapted automatically to filter contaminants from forced air and clean itself of the contaminants.

Another object of the invention is to provide an improved cyclone air filter for filtering liquid and solid contaminants from forced air.

An additional object of the invention is to provide a cyclone air filter whereby compressed or other forced air is both filtered and cooled in flowing through the filter.

A further object of the invention is to provide a cyclone air filter for forced air which has no moving parts and wherein the air during filtering is forced downwardly through a finned helical conduit exposed to ambient air, thereby making use of both centrifugal force and condensation in separating a liquid contaminant from the air.

Another object of the invention is to provide an air filter assembly wherein suspended contaminants are separated from compressed air by a cyclone air filter and at intervals are drained from the filter by being forced upwardly by the pressure of the air through a cyclically operated drain valve mounted on top of the filter, thereby not only limiting the accumulation of contaminants in the filter but preventing clogging of the drain valve by avoiding its prolonged exposure to the contaminants.

Another object of the invention is to provide an air filter assembly which has a minimum of moving parts and will operate automatically over long periods without substantial reduction in its efficiency.

Other objects and advantages of the invention will appear hereinafter in the detailed description, be particularly pointed out in the appended claims and be illustrated in the accompanying drawings, in which:

Figure 1:
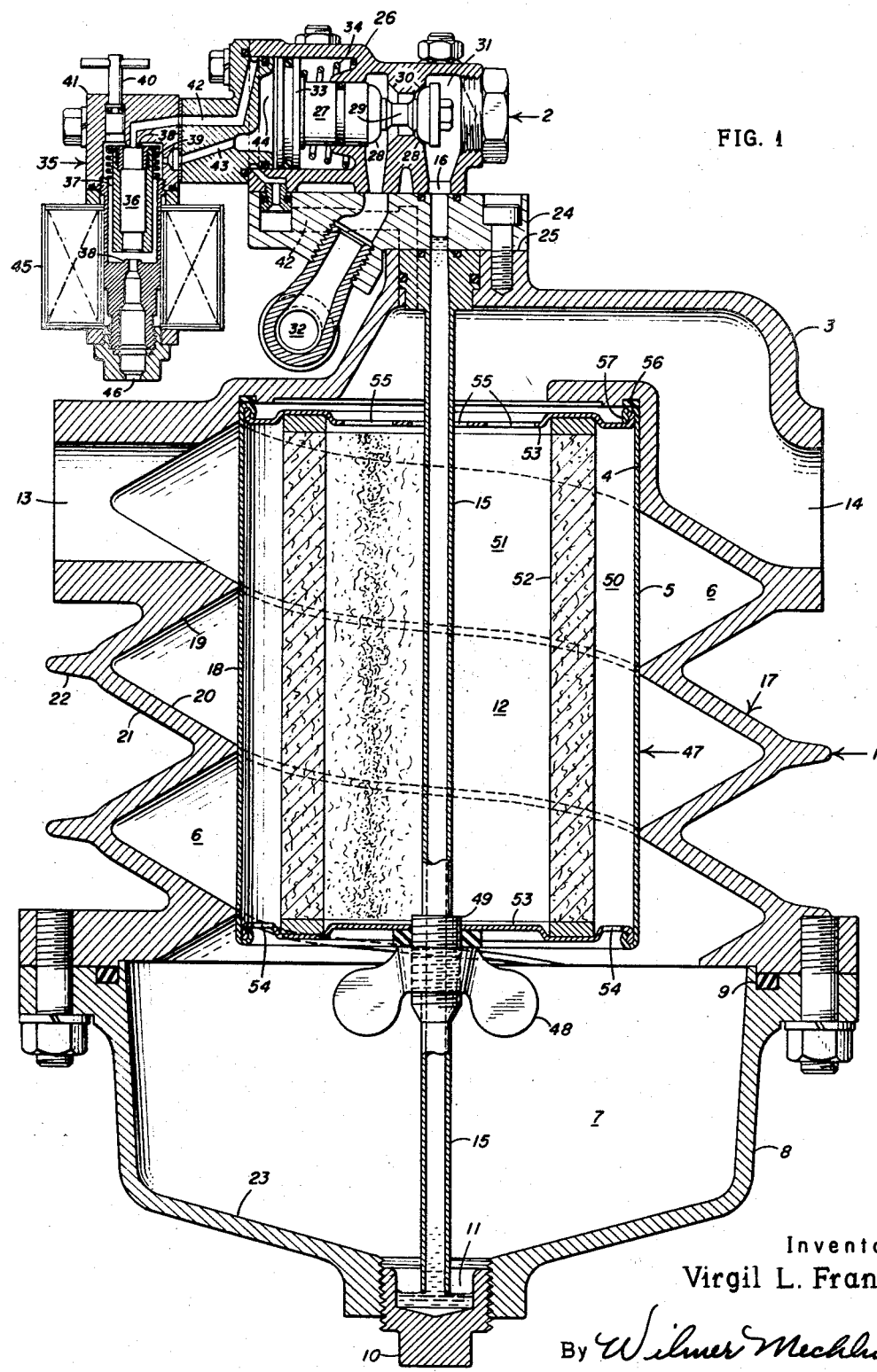
FIGURE 1 is a central vertical sectional view of an embodiment of the air filter assembly of the present invention preferred for large volume filtering.

Referring now in detail to the drawings in which like reference characters designate like parts, the air filter assembly of the present invention, while applicable generally for filtering suspended liquid and solid contaminants from forced air, is particularly adapted for use in the compressed air systems of on and off rail land vehicles for both filtering and cooling the compressed air before it is applied to operate the brakes, sanders or other air-operated devices with which the particular vehicle is equipped.

Figures 2, 3, 4:
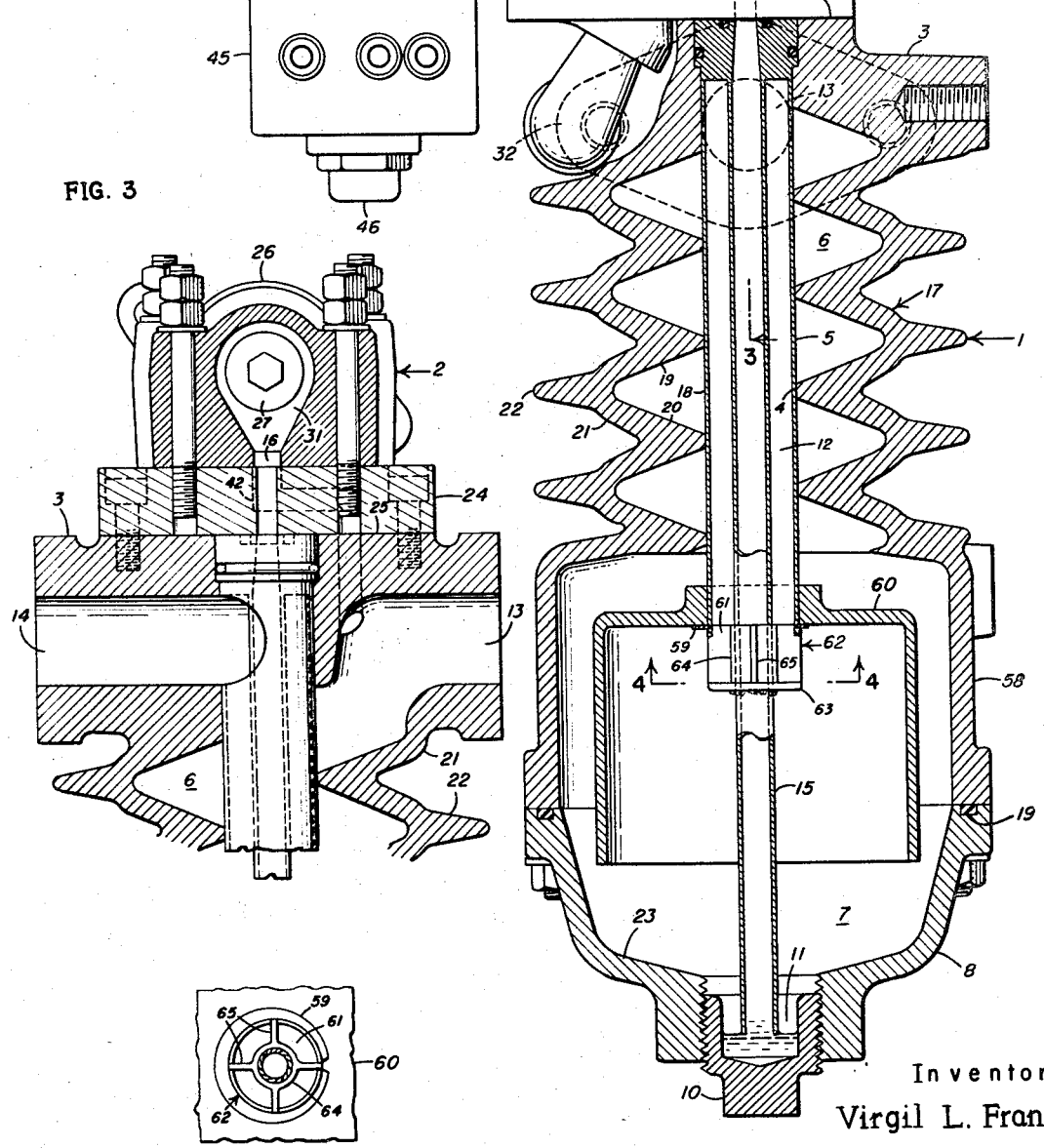
FIGURE 2 is a view partly in side elevation and partly in central vertical section of another embodiment of the air filter assembly of the present invention.
FIGURE 3 is a fragmentary vertical sectional view taken along lines 3—3 of FIGURE 2.
FIGURE 4 is a fragmentary horizontal sectional view taken along lines 4—4 of FIGURE 2.

Two embodiments have been illustrated as exemplary of the invention, one in FIGURE 1 having a plural stage filter and the other in FIGURES 2–4 in which the filter is single stage. Although differing somewhat in their details, the illustrated assemblies are basically the same. Each includes a cyclone or stationary part centrifugal air filter 1 and a drain valve 2 surmounting or mounted on top of the filter. In each case the cyclone or centrifugal filter 1 is comprised of a housing or casing 3 having a vertical, preferably cylindrical central bore 4 in which is seated or received a cylindrical or otherwise suitably configured sleeve 5 having a close or sliding fit with the bore. A helical or spiral passage surrounding or encircling the bore 4 and bounded inwardly by the sleeve 5, opens downwardly onto a sump 7. Conveniently, the sump 7 is formed by a bowl or cup 8 bolted or otherwise releasably attached to the bottom of the housing 3, with an air-tight seal provided about the sump between the bowl and the housing by a suitable sealing gasket 9. A clean-out plug 10, coaxial or concentric with the central bore 4 and having an upwardly opening central cavity 11, is screwed into the bottom of the bowl 8. A central vertical air passage 12, confined or bounded outwardly by the sleeve 5, connects to the helical passage 6 through the sump 7.

Dirty air under forced draft imparted to it by an impeller (not shown) or a compressor (not shown) and in the latter case taken either directly from the compressor or from an intervening reservoir (not shown), enters or is introduced into the filter 1 through an inlet port or passage 13 in the housing 3. The inlet port opens inwardly onto the upper end of the helical passage 6 and for compactness as well as to make use of impingement in separating entrained contaminants from the entering air, the inlet port 13 preferably is disposed radially of rather than tangential to the bore 4 and the sleeve 5 therein. An outlet port or passage 14 in the upper part of the housing 3 is connected to the upper end of the central air passage 12. A contaminant drain tube or pipe 15 coaxial or concentric with the sleeve 5, extends vertically therethrough with its lower end dipping or projecting into the cavity 11 in the clean-out plug 10, and its upper end connected to a liquid inlet port 16 of the drain valve 2.

In some installations it may be desirable to increase the velocity of the air in the helical passage 6 by reducing its cross-sectional area relative to that of the inlet port 13. However, for use in compressed air systems, such as those of diesel locomotives and trucks and buses, in which the pressure maintained is ordinarily in the range of 100–140 p.s.i., the air velocity obtained on operation of associated devices in an inlet port varying from around 1 9/16 in. for a system in the upper part of the pressure range to around 1 in. for one in the lower part, is quite adequate in the helical passage.

Consequently, in the disclosed embodiments, the helical air passage 6 is of substantially the same cross-sectional area as the inlet port 13. The cross-sectional shape of the helical passage 6 is not particularly important to the centrifugal separation of the air and the solid and liquid contaminants suspended therein, since in any case the contaminants will be thrown and deposited toward the perimeter of the passage because of their greater densities.

Insofar as the filtering is concerned, it therefore is only necessary that the downward gradient of the passage 6 be such that the contaminants, once separated, will move or flow downwardly by gravity to the sump 7, instead of collecting in and ultimately clogging the passage. However, if over the vertical limits of the passage 6, the housing 3 is to act as a radiator and enable the gas to be cooled as well as filtered in passing through the passage, it is important for efficiency that the inner and outer configurations of the side wall 17 of the housing be such as to present or expose large areas to the contained and ambient air. To this end, the helical passage 6 in each of the illustrated embodiments, is shaped substantially as an isosceles triangle with a relatively short inner wall or base 18 formed by the sleeve 5 and its outwardly projecting and converging upper and lower sides or side walls 19 and 20, respectively, formed by and fully exposed to the side wall 17 of the housing 3. The outer surface 21 of the side wall 17 is convoluted to follow the helical convolution of the passage 6 and (for increased exposure to ambient air, also is finned, as by the helical fin 22 centered vertically on and following the perimeter of the passage.

Preferably constructed in the above manner, the air filter 1 of either embodiment causes the compressed or forced air entering through the inlet port 14 to impinge upon the confronting surface of the sleeve 5 and be diverted by that surface to flow as a helical vortex or cyclone downwardly through the helical passage 6 in a predetermined, transversely confined or contained helical or spiral path. Losing part of the entrained or suspended water, oil or other contaminants in solid or free liquid by the initial impingement upon the sleeve 5 as it enters the filter 1, as a result of the radial or normal disposition of the inlet port 13 relative to the sleeve, the air as it whirls or rotates as a transversely contained or confined vortex or cyclone in the passage 6 around the sleeve is subjected to centrifugal force by which the suspended contaminants because of their greater densities are centrifugally separated and deposited on the sides 19 and 20 of the passage, thereafter to move or flow downwardly along the sides to the sump 7.

Not only does the centrifugal force exerted as a result of the vortical or cyclonic flow of the air in the passage 6, effectively separate the liquid and solid contaminants therefrom but the effect of the centrifugal force on the air itself is to concentrate or compact it toward the outside of the passage and create a partial vacuum toward the inside. The effect even in still ambient air is a progressive reduction toward the bottom of the passage of the temperature of the inner wall 18 to a point far below that of the air introduced into the filter and a substantial drop in the temperature of the air itself across or from end to end of the passage. And if the ambient air is moving, the concentration of the mass and thus the heat of the air toward the perimeter of the passage 6, in conjunction with the large areas of the side wall 17 exposed to the contained and ambient air, will produce a very substantial drop, indeed, of the contained air across the passage, a drop of 25° F. even in the heat of summer being commonplace. Although depending in extent upon the vapor content of the air entering the filter, a side effect of the cooling of the air as it passes through the passage 6 is to condense part of the vapor content and, as liquid, subject it to the centrifugal separation, thus increasing the efficiency of the filtering in the passage.

Filtered and cooled as it flows through the passage 6, the air introduced into the filter 1 flows from the passage into the sump 7 and thence upwardly through the central air passage 12 to the outlet port 14. In turn, the contaminants separated from the air and deposited in the passage 6, will be caused by the gradient of the passage and downward slope of the wall 23 of the bowl 8, to flow downwardly by gravity to and collect in the cavity 11 in the clean-out plug 10. With its surface constantly exposed to the pressure of the air in the sump 7, the accumulated liquid contaminant, so long as the lower end of the drain tube or passage 15 is below the liquid's surface, will be forced upwardly by the air pressure through the tube and the drain valve 2, whenever the latter is open, and entrain or carry off with it at least the lighter solid contaminants.

Even though air may be flowing continuously through the filter 1, as during operation of brakes or other air-operated devices, intermittent, periodic or at intervals opening of the drain valve 2 will usually be desired to permit the separated liquid to accumulate in the interim in the cavity 11. It is for this reason that the preferred drain valve 2, which is used in both of the illustrated assemblies, is solenoid actuated for cyclic electric operation by a suitable timing device, such as that shown in Koeppel et al. application Ser. No. 200,462, filed on June 6, 1962, now Patent No. 3,283,097 issued Nov. 1, 1966.

Surmounting or mounted on top of the housing 3, the preferred drain valve 2 has a base 24 bolted to a seat 25 on the upper end of the housing 3 and a body 26 bolted to the base. Not only is the capacity of the cavity 11 in the plug 10 small but it is desirable to restrict the accumulation of contaminants to that cavity to prevent re-entrainment in the air as the latter sweeps through the sump 7. Consequently, the interval during which the drain valve 2 is open to drain the accumulated liquid should be very brief, with the added advantage in such brevity that, in being discharged or expelled as a slug, the accumulated liquid will tend to entrain the heavier as well as the lighter solid contaminants.

The preferred drain valve provides the desired brief drain cycle by having in its body 26 a differential piston 27 having a pair of smaller heads or valve elements 28 connected by a stem 29 and alternately seatable in an intervening pair of opposed valve seats 30. Entering the inlet side of the valve chamber 31 containing the heads 28 through the liquid inlet port 16, the accumulated liquid, when both of the valve elements 28 are unseated, passes through the seats 30 to the outlet side of the chamber and thence to the liquid drain or outlet port 32 under the driving force of the compressed air in the sump 7. With this arrangement, the valve 2 is momentarily open for draining of the accumulated liquid during both the advance and return strokes of the piston 27, the former under air pressure applied to its large head 33 and the latter under force of the return spring 34.

The preferred solenoid or solenoid-actuated valve 35 for controlling the operation of the piston 27 is of the type disclosed in my copending application Ser. No. 333,994, filed Dec. 27, 1963. Like the valve of that application, the solenoid valve 35 has a composite plunger 36 reciprocable in a vertical bore 37 between seats 38 at opposite ends of the bore. Normally, the plunger 36 is held against the upper seat by a spring 39, with manual displacement for testing or servicing permitted by a pin 40 mounted in the body 41.

Actuating air for the piston 27 may be dirty air but preferably is clean air filtered by the filter 1 and drawn from the outlet passage 14 beyond the central passage 12, through the seat 25, base 24 and bodies 26 and 41 to the normally closed upper seat 38 of the solenoid valve 35. Entering the solenoid valve through that seat, the actuating air is applied to the large head 33 of the piston 27 through a second connecting passage 43 opening at one end onto a side of the bore 37 and at the other onto the head chamber 44 containing the head. Powering the advance stroke of the piston 27 in response to displacement of the plunger 36 from the upper seat 38 on energizing of the solenoid 45, the actuating air in the chamber 44, when the supply is cut off by de-energizing of the solenoid, bleeds through the second connecting passage 43 back to the bore and is exhausted from the bore through the lower seat 38 therein and vertical bleed port 46 leading downwardly to the bottom of the solenoid valve.

Alike in the foregoing particulars, the assemblies of the illustrated embodiments differ in some respects in their filters 1, mainly in the number of filtering stages. As mentioned earlier, the cooling of the air as it passes through the helical separating or filtering passage 6 can increase the efficiency of the centrifugal filtering by condensing moisture from vapor to liquid. However, depending on the moisture content of the entering air and the temperature drop through the passage, the air can become super-saturated within the passage. In this condition of the air, the excess moisture is of too small particle size to be removed by centrifugal force but can be removed by passing the air through a hygroscopic filtering medium. It is to remove such excess moisture that the embodiment of FIGURE 1 has a plurality of filtering stages, the first the helical passage 6 and the second a hygroscopic filtering unit 47 positioned to remove any excess moisture from the air as it passes upwardly through the central passage 12.

In its preferred form, the filtering unit 47 is a replaceable filter cartridge slidable from below into the bore 4 of the housing 3 on removal of the bowl 8. Centrally apertured to receive the drain tube 15, the cartridge unit 47 is slidable therealong to seated position in the bore 4 and is releasably held in that position, suitably by a wing nut threaded onto a collar 49 fixed to the tube and extending below the unit. In this embodiment, the cylindrical side wall of the cartridge unit 47 forms the sleeve 5 and the central air passage 12 is divided or partitioned radially or laterally by a cylindrical filter element 51 of porous, moisture-absorbent paper or like suitable hygroscopic material. The filter element 52 is held in position by suitable stamping or crimping of the unit's end plates 53, the lower of which is apertured, as at 54, outwardly of the element to pass air from the sump 7 into the outer passage 50, while the apertures 55 in the upper plate are positioned between the element and the drain tube 15 to connect the inner passage 51 to the outlet passage 14. Thus the air in passing through the central passage 12 from the sump 7 to the outlet passage 14, must pass through the filter element 52 and in process has its excess moisture absorbed by the element. To ensure against mixing of the dirty entering air with the filtered air, a gasket 56 is provided in the upper end of the bore 4 for seating the crimped upper edge 57 of the unit 47.

In the second embodiment of FIGURES 2-4, both the side wall 17 of the housing 3 and the sleeve 5 extend below the passage 6, the former as an annular lower extension or skirt 58. Within the skirt 58 and releasably mounted on the lower extension of the sleeve 5, as by a snap ring 59, is a downwardly opening hood or baffle 60 which is spaced inwardly from the skirt and projects downwardly into the bowl 8.

Directing the filtered air from the passage 6 between itself and the skirt 58 to the sump 7 before permitting the air to pass upwardly to the central passage 12 between the sleeve 5 and the drain tube 15, the hood 60 by spreading out the air and so damping the swirling or vortical motion imparted to it in the passage 6, decreases the possibility of re-entrainment of contaminants by the air as it passes over them through the sump 7. For further minimizing and practically inhibiting re-entrainment of contaminants, the entrance 61 to the central passage 12 is guarded from below by a deflector 62 having a horizontal disc or baffle plate 63 fixed to the drain tube 15 below the entrance and surmounted by a hub 64 from which project radial veins 65. So constructed, the deflector 62 effectively eliminates any swirling motion remaining in the air before it enters the central passage 12. Although having anly a single filtering stage, the assembly of the second embodiment can readily have its filter 1 converted into a plural stage filter by mounting on the drain tube 15 below the entrance 61 to the central passage 12 a filter cartridge such as used in the first embodiment, in which case the hood 60 and deflector 62 can be dispensed with.

Having no moving parts except for the piston 27 and plunger 36 of the drain valve 2, and adapted by the downward gradient of the passage 6 and slope of the wall 23 of the bowl 8 and the cyclic operation of the valve to expel or clean or rid themselves of contaminants separated from the air in the passage, the assemblies of the illustrated embodiment will operate at peak efficiency over long periods without attention. Too, although the tortuous path the air must follow between the inlet and outlet ports 13 and 14 might indicate the contrary, the pressure drop between these ports, at least in compressed air systems in which the pressure maintained is on the order of or above 100 p.s.i., is so negligible as not to be readable on a standard air gauge. For a given installation, the capacity will depend upon the area of the inlet port 13 and pressure of the system in which the assembly is installed. Under test, the commercial form of the first embodiment with an entrance port diameter of 1⁹⁄₁₆ in. and installed in the compressed air system of a diesel locomotive in which the pressure maintained is on the order of 150 lbs. p.s.i., can operate effectively at a flow rate as high as 400 c.f.m., although in service it will usually be called upon to handle a lower flow rate of from 200 to 250 c.f.m.

From the above detailed description it will be apparent that there has been provided an improved air filter assembly capable of both filtering and cooling forced air and having a long, trouble-free life. It should be understood that the described and disclosed embodiments are merely exemplary of the invention and that all modifications are intended to be included that do not depart from the spirit of the invention and the scope of the appended claims.

Having described my invention, I claim:

1. An assembly for filtering forced air comprising a filter having a housing, a vertical bore in said housing, a sleeve inserted into and seated in said bore, a sump in a lower part of said housing below said bore, a vertically directed helical groove in the side wall of said housing about said bore and closed inwardly by said sleeve thereby defining a helical passage, said passage fluidly communicating at its upper end with an inlet port in said housing and at its lower end with said sump and directing forced air introduced through said port downwardly in a fixed helical path for centrifugally separating contaminants from said air and discharging said separated contaminants and filtered air into said sump, a tube extending upwardly through said sleeve from a contaminant cavity in a bottom of said sump and having a passage therethrough for passing contaminants upwardly from said cavity, a filtered air passage in said sleeve between said sleeve and said tube for passing filtered air upwardly to an outlet port in said housing from said sump, and drain valve means surmounting said housing and connected to said contaminant passage for draining contaminants from said sump under pressure of said air.

2. An assembly for filtering forced air comprising a filter having a housing, a vertical bore in said housing, a sleeve inserted into and seated in said bore, a sump in a lower part of said housing below said bore, a vertically directed helical groove in the side wall of said housing about said bore and closed inwardly by said sleeve thereby defining a helical passage, said passage fluidly communicating at its upper end with an inlet port in said housing and at its lower end with said sump and directing forced air introduced through said port downwardly in a fixed helical path for centrifugally separating contaminants from said air and discharging said separated contaminants and filtered air into said sump, a tube extending upwardly through said sleeve from a contaminant cavity in a bottom of said sump and having a passage therethrough for passing contaminants upwardly from said cavity, a filtered air passage in said sleeve between said sleeve and said tube for passing filtered air upwardly to an outlet port in said housing from said sump, an air-actuated drain valve mounted on said housing above said filtered air passage and connected to said contaminant passage for draining separated contaminants from said sump under pressure of the air therein, a cyclically operable solenoid valve for applying actuating air to and cyclically actuating said drain valve, and means connecting said solenoid valve to said filtered air passage for supplying filtered air for actuating said drain valve.

3. An assembly for filtering forced air comprising a filter having a housing, a vertical bore in said housing, a sleeve inserted into and seated in said bore, a sump in a lower part of said housing below said bore, a vertically directed helical groove in the side wall of said housing about said bore and closed inwardly by said sleeve thereby defining a helical passage, said passage fluidly communicating at its upper end with an inlet port in said housing and at its lower end with said sump and directing forced air introduced through said port downwardly in a fixed helical path for centrifugally separating contaminants from said air and discharging said separated contaminants and filtered air into said sump, a tube extending upwardly through said sleeve from a contaminant cavity in a bottom of said sump and having a passage therethrough for passing contaminants upwardly from said cavity, a filtered air passage in said sleeve between said sleeve and said tube for passing filtered air upwardly to an outlet port in said housing from said sump, a drain valve mounted on said housing above said filtered air passage and having a valve chamber connected on its inlet side to said contaminant passage and on its outlet side to atmosphere, opposed valve seats in said chamber between said inlet and outlet sides, an air advance spring return piston having opposed heads alternately seatable in said seats at opposite limits of movements of said piston for blocking flow between said inlet and outlet sides except during advance and return strokes of said piston, a cyclically operable solenoid valve for applying actuating air to and cyclically actuating said drain valve, and means connecting said solenoid valve to said filtered air passage for supplying filtered air for actuating said drain valve.

4. An assembly for filtering forced air comprising a filter having a housing, a vertical bore in said housing, a sleeve inserted into and seated in said bore, a sump in a lower part of said housing below said bore, a vertically directed helical groove in an externally finned helically convoluted portion of the side wall of said housing about said bore and closed inwardly by said sleeve thereby defining a helical passage, said passage fluidly communicating at its upper end with an inlet port in said housing and at its lower end with said sump and directing forced air introduced through said port downwardly in a fixed helical path for centrifugally separating contaminants from and cooling said air and discharging said separated contaminants and filtered air into said sump, a tube extending upwardly through said sleeve from a contaminant cavity in a bottom of said sump and having a passage therethrough for passing contaminants upwardly from said cavity, a filtered air passage in said sleeve between said sleeve and said tube for passing filtered air upwardly to an outlet port in said housing from said sump, and drain valve means surmounting said housing and connected to said contaminant passage for draining contaminants from said sump under pressure of said air.

5. An assembly for filtering forced air comprising a filter having a housing, a vertical bore in said housing, a sleeve inserted into and seated in said bore, a sump in a lower part of said housing below said bore, a vertically directed helical groove in the side wall of said housing about said bore and closed inwardly by said sleeve thereby defining a helical passage, said passage fluidly communicating at its upper end with an inlet port in said housing and at its lower end with said sump and directing forced air introduced through said port downwardly in a fixed helical path for centrifugally separating contaminants from said air and discharging said separated contaminants and filtered air into said sump, a tube extending upwardly through said sleeve from a contaminant cavity in a bottom of said sump and having a passage therethrough for passing contaminants upwardly from said cavity, a filtered air passage in said sleeve between said sleeve and said tube for passing filtered air upwardly to an outlet port in said housing from said sump, a hygroscopic filter element in said filtered air passage for filtering said filtered air during passage thereof from said sump to said outlet port, and drain valve means surmounting said housing and connected to said contaminant passage for draining contaminants from said sump under pressure of said air.

6. An assembly for filtering forced air comprising a filter having a housing, a vertical bore in said housing, a sleeve inserted into and seated in said bore, an inlet port in said housing and directed normal to said sleeve for causing forced air to impinge upon said sleeve on entering said port, a sump in a lower part of said housing below said bore, a vertically directed helical groove in the side wall of said housing about said bore and closed inwardly by said sleeve thereby defining a helical passage, said passage fluidly communicating at its upper end with said inlet port in said housing and at its lower end with said sump and directing forced air introduced through said port downwardly in a fixed helical path for centrifugally separating contaminants from said air and discharging said separated contaminants and filtered air into said sump, a tube extending upwardly through said sleeve from a contaminant cavity in a bottom of said sump and having a passage therethrough for passing contaminants upwardly from said cavity, a filtered air passage in said sleeve between said sleeve and said tube for passing filtered air upwardly to an outlet port in said housing from said sump, and drain valve means surmounting said housing and connected to said contaminant passage for draining contaminants from said sump under pressure of said air.

7. An assembly according to claim 1, wherein the lower part of the housing containing the sump is releasably attached to an upper part thereof, and the sleeve is a side of a filter unit releasably mounted in the bore on the tube and defining with the tube the filtered air passage, said unit including a hygroscopic filter element for filtering the filtered air during passage thereof from the sump to the outlet port.

8. An assembly for filtering forced air comprising a filter having a housing, a vertical bore in said housing, a sleeve inserted into and seated in said bore, a sump in a lower part of said housing below said bore, a vertically directed helical groove in the side wall of said housing about said bore and closed inwardly by said sleeve thereby defining a helical passage, said passage fluidly communicating at its upper end with an inlet port in said housing and at its lower end with said sump and directing forced air introduced through said port downwardly in a fixed helical path for centrifugally separating contaminants from said air and discharging said separated contaminants and filtered air into said sump, said side wall below said passage being formed as a skirt to which said lower part of said housing containing said sump is releasably attached, a contaminant drain tube projecting downwardly into a contaminant cavity in a bottom of said sump and centered on and extending upwardly through said sleeve, a central air passage in said sleeve about said tube for directing filtered air upwardly from said sump to an outlet air port in said housing, a downwardly opening hood on said sleeve about an entrance therein to said central air passage and extending outwardly below said helical passage and downwardly from said sleeve for damping the motion imparted to said filtered air by said helical passage, a deflector within said hood at the entrance to said vertical passage for further damping said motion, and drain valve means surmounting said housing and connected to said tube for draining contaminants from said passage under pressure of said air.

References Cited

UNITED STATES PATENTS

| | | | |
|---|---|---|---|
| 496,897 | 5/1893 | Rathbun | 55—349 X |
| 1,766,666 | 6/1930 | Meyer | 55—218 |
| 2,007,358 | 7/1935 | Anger | 137—204 |
| 2,125,145 | 7/1938 | Aikman | 137—204 |
| 2,177,510 | 10/1939 | Aikman | 137—204 |
| 2,274,050 | 2/1942 | Etwanik | 55—457 X |
| 2,326,687 | 8/1943 | Sanford | 137—204 |
| 2,330,027 | 9/1943 | Churchman et al. | 137—204 |
| 2,377,549 | 6/1945 | Gustafsson et al. | |
| 2,409,211 | 10/1946 | Kalle | 55—431 X |
| 2,509,879 | 5/1950 | Pelton | 137—204 |
| 2,692,655 | 10/1954 | Peeps. | |
| 2,894,600 | 7/1959 | Veres. | |
| 2,956,728 | 10/1960 | Goepfrich et al. | 137—203 X |
| 3,093,467 | 6/1963 | McLaughlin | 55—269 X |
| 3,130,023 | 4/1964 | Hasselberg | 55—219 |
| 3,176,954 | 4/1965 | Cameron et al. | 251—29 |

FOREIGN PATENTS

| | | |
|---|---|---|
| 215,373 | 5/1961 | Austria. |
| 554,445 | 7/1943 | Great Britain. |
| 46,330 | 12/1908 | Switzerland. |

HARRY B. THORNTON, *Primary Examiner.*

D. TALBERT, *Assistant Examiner.*